April 21, 1931.　　C. BROUDY ET AL　　1,801,949
REGISTER FILTER
Original Filed Oct. 20, 1928
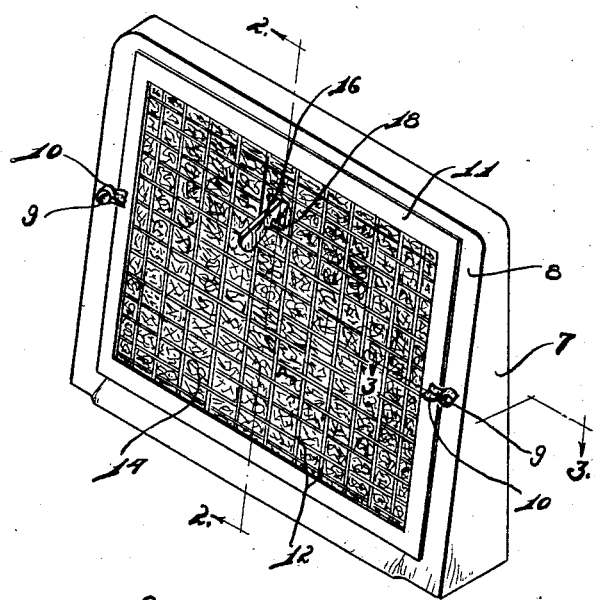
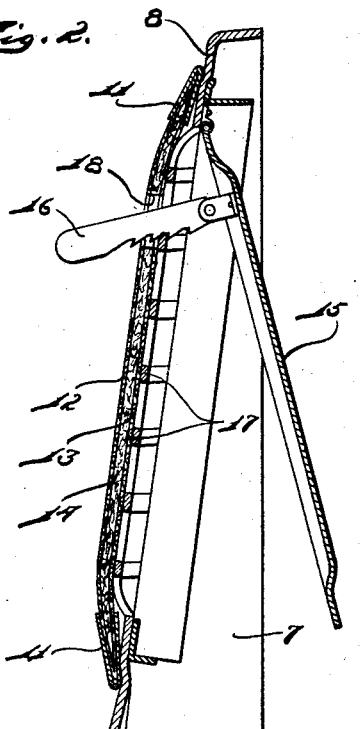
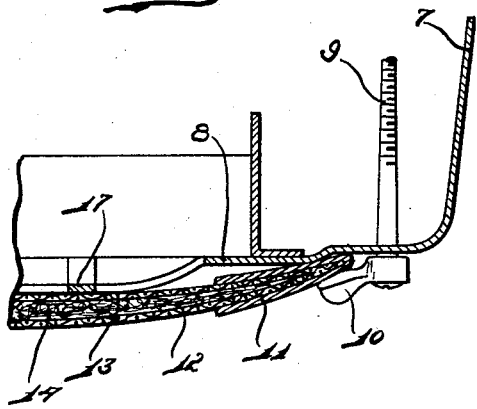
INVENTOR.
Celia Broudy
Isadore Broudy
BY
ATTORNEY.

Patented Apr. 21, 1931

1,801,949

UNITED STATES PATENT OFFICE

CELIA BROUDY AND ISADORE BROUDY, OF DETROIT, MICHIGAN, ASSIGNORS TO MILES E. HEATH, OF DETROIT, MICHIGAN

REGISTER FILTER

Application filed October 20, 1928, Serial No. 313,790. Renewed March 4, 1931.

Our invention relates to a new and useful improvement in a register filter, and has for its object, the provision of a device which may be attached to a hot air register and serve to filter, from the air projected therefrom, all dust and other solid particles.

It is another object of the invention to provide a device of this class which will be simple of structure, economical of manufacture and highly efficient in use.

Another object of the invention is the provision of a device of this class which may be easily and quickly attached to and removed from a register frame.

Another object of the invention is the provision of a device of this class which may be attached to the outer surface of a register frame and permit adjustment at will of the register closure.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the register frame showing the invention applied.

Fig. 2 is a sectional view taken on line 2—2 of Fig. 1.

Fig. 3 is a sectional view taken on line 3—3 of Fig. 1.

In the drawings we have illustrated the invention adapted for use with a register frame 7 provided with the front face forming flanges 8, through which screws 9 may be projected for securing the frame to a wall over the hot air pipe opening. Secured pivotally by these screws, on the outer side of the front face of the frame, are keepers 10, which serve to engage and secure the filter in position over the opening in the frame. The filter comprises a frame 11 formed from metal doubled upon itself and secured in which are the edges of spaced screens 12 and 13, between which is a suitable filter medium, such as metal wool 14 or the like. The register frame is provided with the closure 15 which is pivotally mounted and controlled by the serrated arm 16, which projects through one of the openings in the grate 17. An elongated opening 18 is formed in the screens 12 and 13 to permit the necessary movement of the arm 16.

The invention is applied as shown in Fig. 1, the keepers 10 being turned to engage the frame 11. The arm 16 projects through the opening as shown. When it is desired to remove the filter for the purposes of cleaning, it is but necessary to move the keepers into disengaging position, upon which the filter may be bodily removed. It is believed evident that this operation is quite a simple one, and one which the ordinary housewife may very easily and quickly perform.

While we have illustrated and described the preferred form of our invention, we do not wish to limit ourselves to the precise details of structure shown, but desire to avail ourselves of such variations and modifications as come within the scope of the appended claim.

Having thus described our invention, what we claim as new and desire to secure by Letters Patent is:

A register filter of the class described adapted for use with a register having a frame, said filter comprising a filtering member, a pair of spaced screens at opposite sides of said filtering member and supporting the same, a frame engaging said screens and securing the same in supporting position relatively to said filtering member, said screens and said filtering member having an opening formed therein for accommodating the register closure control arm.

In testimony whereof we have signed the foregoing specification.

CELIA BROUDY.
ISADORE BROUDY.